United States Patent [19]

Wiseman et al.

[11] Patent Number: 4,744,702

[45] Date of Patent: May 17, 1988

[54] MODULAR AIR CONVEYOR CONSTRUCTION

[75] Inventors: John A. Wiseman, Lynchburg; Gregory S. Burns, Forest, both of Va.

[73] Assignee: Simplimatic Engineering Co., Lynchburg, Va.

[21] Appl. No.: 2,623

[22] Filed: Jan. 12, 1987

[51] Int. Cl.$^4$ ............................................. B65G 53/04
[52] U.S. Cl. ..................................................... 406/88
[58] Field of Search ............................ 406/86, 88, 89; 198/836, 860.2, 860.3, 860.5, 861.1; 414/676; 193/35 J, 2 A

[56] References Cited

U.S. PATENT DOCUMENTS

| | | | |
|---|---|---|---|
| 2,527,466 | 10/1950 | Townsend et al. | 406/89 |
| 2,676,851 | 4/1954 | Sylvest | 406/89 |
| 3,411,831 | 11/1968 | Smith | 406/88 |
| 3,605,994 | 9/1971 | Parlette | 198/836 X |
| 3,669,244 | 6/1972 | Pagdin et al. | 198/861.1 X |
| 3,773,391 | 11/1973 | Crandall et al. | 406/88 |
| 3,774,972 | 11/1973 | Grapengiesser et al. | 406/89 |
| 3,800,938 | 4/1974 | Stone | 198/836 X |
| 4,418,813 | 12/1983 | Leinenger | 193/2 R |
| 4,534,461 | 8/1985 | Silverthorn et al. | 198/860.2 X |

FOREIGN PATENT DOCUMENTS

| | | | |
|---|---|---|---|
| 1204423 | 1/1960 | France | 406/89 |
| 1326431 | 8/1973 | United Kingdom | 406/88 |

*Primary Examiner*—Joseph F. Peters, Jr.
*Assistant Examiner*—James M. Kannofsky
*Attorney, Agent, or Firm*—James & Franklin

[57] ABSTRACT

An easily assembled and disassembled modular construction for an air conveyor comprises standardized side, bottom and top walls adapted to be assembled together, at the point of use if so desired, to produce a conveyor section, with individual sections being joined together to produce conveyors of desired length and configuration. The top wall constitutes the wall over which the conveyed objects move, the bottom and top walls can be provided in varying widths, and the standardized side walls are configured to receive and hold the top and bottom walls, to have brackets mounted thereon, which brackets can carry auxiliary elements such as side guide rails or top covers for the conveying space, and to receive splice plates and other elements, all preferably through the use of headed fasteners the heads of which are received in key slots provided on the outer surfaces of the side walls.

17 Claims, 6 Drawing Sheets

MODULAR AIR CONVEYOR CONSTRUCTION

The present invention relates to the construction of air conveyors from modular assemblies composed of wall elements specially designed to facilitate the modular approach to construction.

Air conveyors are becoming increasingly popular, particularly when the rapid conveyance of relatively light objects is involved. Through the use of a flow of fluid, usually air, which engages the objects to be conveyed and moves them along the desired conveyor path, the objects can be moved reliably and rapidly by relatively inexpensive equipment which does not involve moving parts, such as a conveyor belt with associated mechanism, and which therefore functions well over a long period of time without need for significant maintenance or repair. While these air conveyors take a number of different forms, of which the conveyor shown in Futer U.S. Pat. No. 4,392,760 of July 12, 1983 entitled "Surface Flow Air Conveyor With Plenum Mounted Fan Wheel" (which patent is assigned to the assignee of this application) may be considered as representative, they have in the past suffered from one general drawback, to wit, their manufacture involved significant assembly operations at their source, necessitating considerable floor space devoted thereto, a drawback compounded by the fact that most conveyors had to be tailor-made to fit the particular application where they were to be used. Each factory installation where a conveyor is to be installed differs from the next, not only in the type and number of objects to be conveyed but also in the precise geography of the conveyor line, which usually extends between operating stations already in existence and fixed in location on a factory floor. Even when the conveyor was formed in sections designed to be secured to one another, as shown in FIG. 1 of U.S. Pat. No. 4,392,760, those sections have been formed of welded-together metal plates, with the welding being performed at the source factory and the sections in final assembled form being shipped to the plant where they are to be installed. Incorporation of often called for auxiliary structures, such as side guides for the conveyed objects or top covers over the conveying spaces, gave rise to additional manufacturing complications.

In order to avoid these manufacturing difficulties, the present invention provides that the air conveyors be constructed from a plurality of standardized parts which, if desired, can be assembled at the place of use to produce an air conveyor with associated structure which will satisfy the varying requirements of different installations.

Conveyors of the type under discussion comprise a plenum structure which extends along the desired conveyance path, the plenum receiving fluid (generally air) from a suitable source. The objects to be conveyed move over the top wall of that plenum, which is appropriately apertured so that the plenum air can escape, engage the objects to be conveyed, usually lift those objects somewhat from the apertured wall so that they can move rapidly without friction, and cause the objects to move in the desired direction, usually at high speed. The plenum space is usually defined between top, bottom and side walls. When side guides for the conveyed objects are needed, they are secured to the plenum and extend up therefrom. Sometimes walls designed to overlie the conveyed objects are mounted on the plenum. The source of conveying fluid communicates with the plenum through an aperture formed in one of the plenum walls.

In accordance with the present invention the walls which define the plenum are not, as in the prior art, welded or otherwise permanently secured to one another in the plant of the manufacturer. They are instead defined by standardized pieces which can be fitted together and secured in position at the point of use. In the form here specifically disclosed the top wall is defined by an appropriately apertured plate of standard length, the bottom wall is defined by a simple plate, and the side walls are defined by structures of relatively complex cross-section shaped specifically to mount and support the top and bottom walls and to receive and support auxiliary elements, such as mounting brackets, splice plates to connect adjacent modular sections, or plenum end closures. Those side walls are provided with longitudinally extending key slots adapted to receive the heads of headed bolts, those bolts being employed to fasten the auxiliary elements in position.

This approach minimizes the number of different parts that need be provided to construct a given conveyor. The side walls at least partially define the height of the plenum, but if a deeper plenum is required the same side walls can be used with a modified bottom wall. The width of the conveyor is determined by the width of the top and bottom walls, but since they are essentially planar walls they can be provided in appropriately different widths for different installations at a minimal additional cost. All of the walls, when assembled, may be held together by bolted tie rods to produce an adequately sealed plenum. Sections of standard length as thus constructed are longitudinally assembled by means of external splice plates secured to the adjacent side walls of different sections by means of headed bolts the heads of which are received within the aforementioned key slots. Brackets may also be secured to the side walls as desired through the use of similar headed bolts, and those brackets can be used for any desired auxiliary purpose, such as carrying, or themselves defining, side guides for the conveyed objects or for supporting an upwardly spaced top cover when that is wanted.

It is the prime object of the present invention to provide a modular structure for an air conveyor which can be assembled, at the point of use if desired, from standardized components.

It is a further object of the present invention to devise an air conveyor construction which is effective for its desired purpose and which can be constructed and delivered at a lesser cost than heretofore.

It is another object of the present invention to devise an air conveyor construction to which auxiliary elements can be attached as and where desired at the point of use and without requiring modification of the conveyor construction per se or prejudicing its fluid integrity.

It is yet another object of the present invention to provide an air conveyor construction which can be readily disassembled to permit maintenance or the repair or replacement of damaged parts.

To the accomplishment of the above, and to such other objects as may hereinafter appear, the present invention relates to a modular air conveyor assembly construction as defined in the appended claims and as described in this specification, taken together with the accompanying drawings in which:

Figure 1:
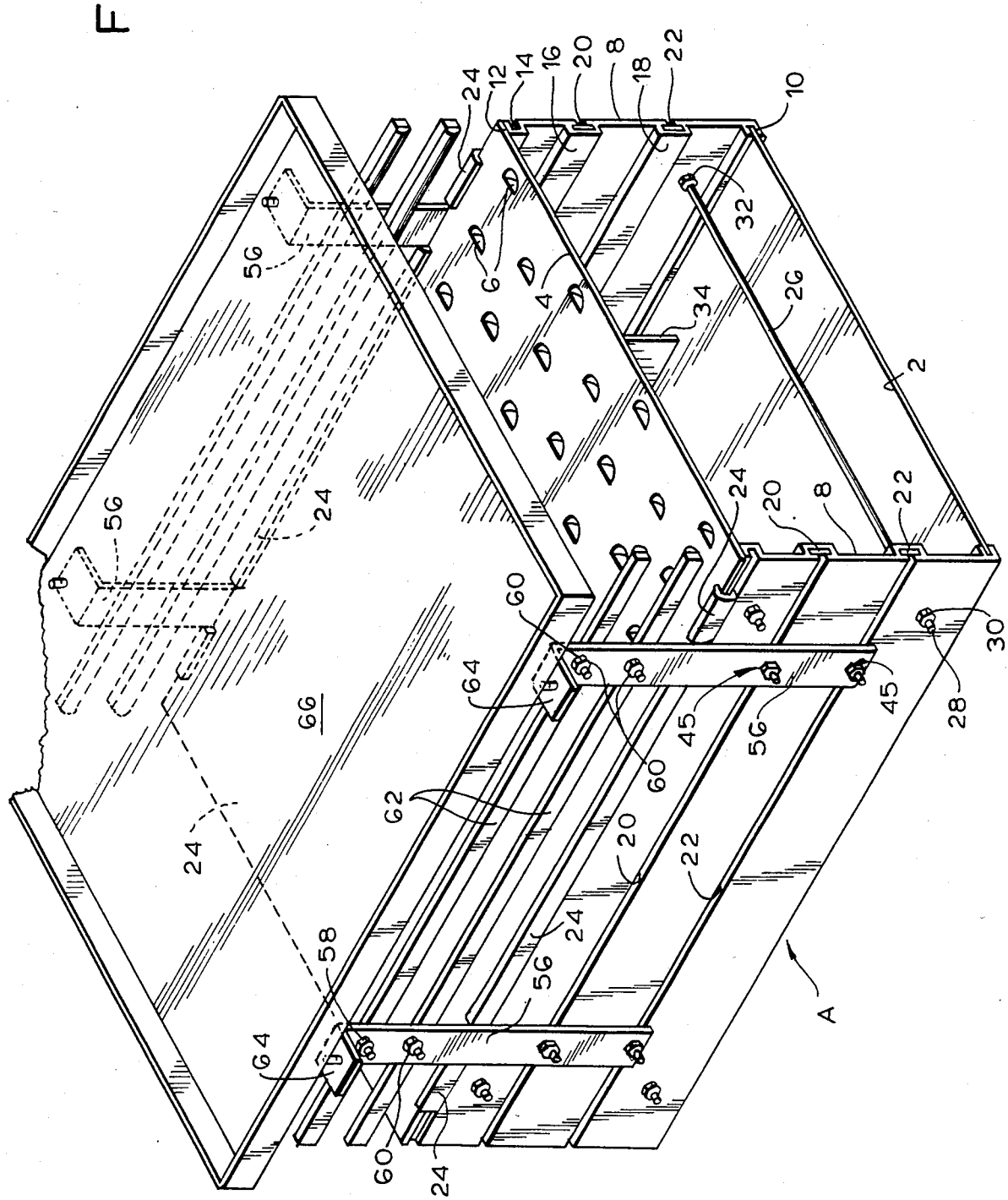
FIG. 1 is a three-quarter perspective view of a typical assembled conveyor section.
Figure 2:
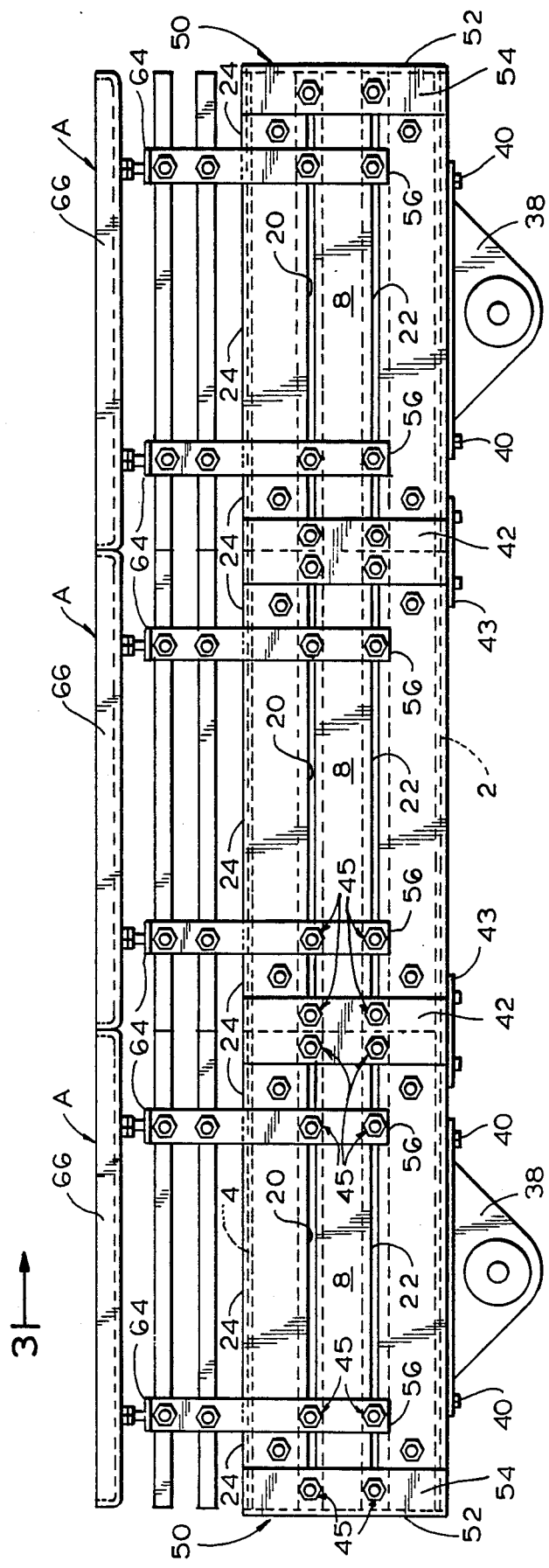
FIG. 2 is a side elevational view showing three such sections longitudinally assembled and with two blower pods attached thereto.
Figure 3:
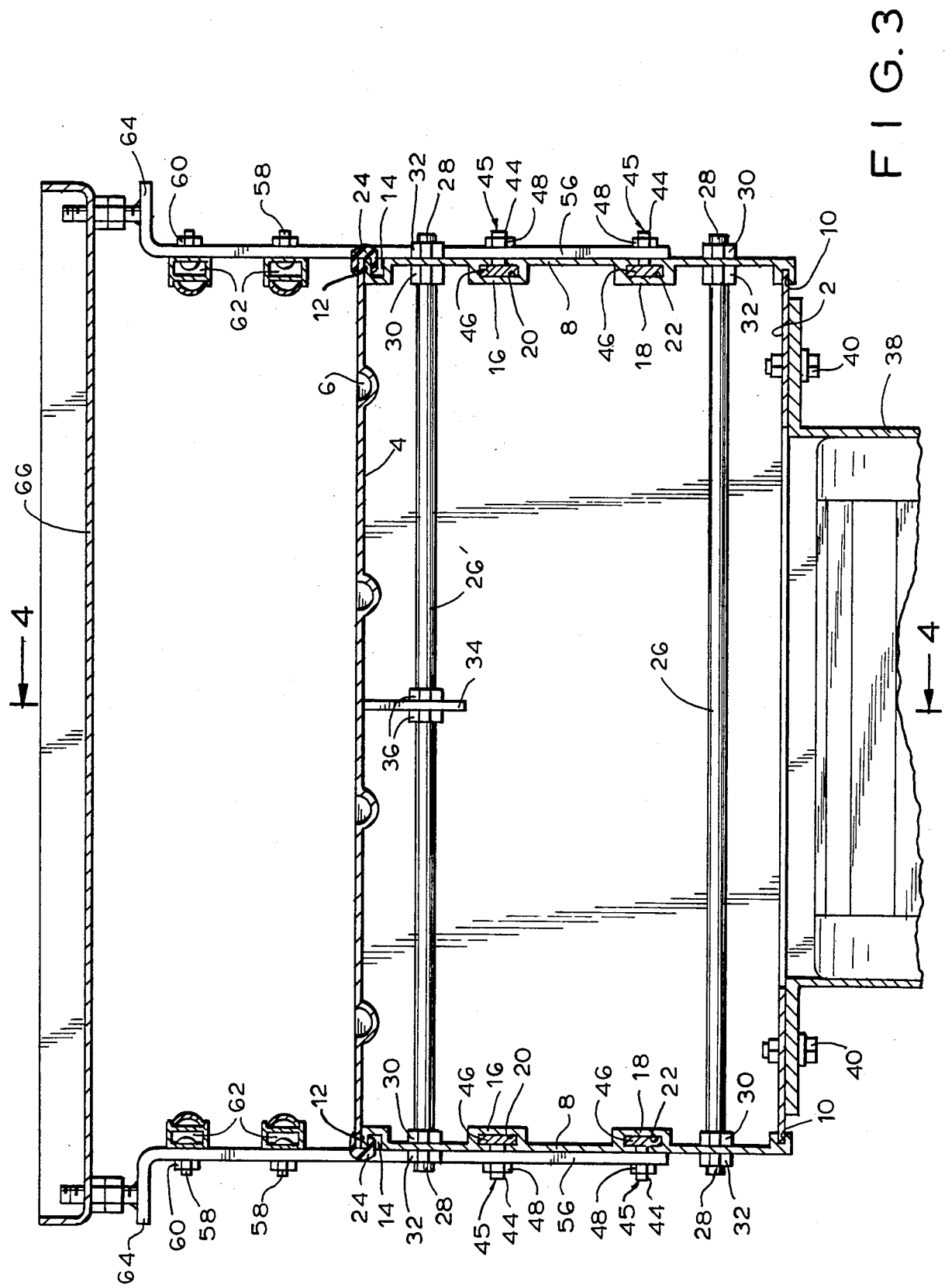
FIG. 3 is a cross-sectional view on an enlarged scale taken along the line 3—3 of FIG. 2.

A given air conveyor made in accordance with the present invention will be formed of a plurality of modular sections generally designated A, one of which is shown in FIG. 1 and three of which, assembled together, are shown in FIG. 2. It will be understood, of course, that there is no limit to the number of said sections A that can be connected together. Moreover, while the section A here specifically illustrated is a straight-line section, it will be appreciated that standardized curved sections may be provided where conveying objects in other than a straight line is called for.

Each of the basic sections A is made up of four standardized parts, a bottom wall 2 to define the bottom of the plenum area, a top wall 4 to define the top wall of the plenum area and provided with apertures 6 through which conveying air passes, the wall 4 providing a surface over which the objects to be conveyed move, and a pair of side walls 8 to define the side walls of the plenum area. The walls 2 and 4 may comprise structural sheets cut to standard length and width, the top wall 4 being provided with the air passage apertures 6 as aforesaid. Since not all conveyors are of the same width, the walls 2 and 4 can be provided in a plurality of standard widths, thus minimizing inventory problems, or they could be cut from larger sheets to desired width as the occasion arises.

The side walls 8 are preferably identical, are of the same length as the walls 2 and 4, and are of a height appropriate to a standardized plenum space, the height of which does not often vary greatly from one installation to another. They are, as may be seen, of relatively complex cross-sectional shape, and it is contemplated that they may best be produced in long strips by extrusion and then cut to desired length. More specifically, in the embodiment here selected for illustration, the walls 8 are provided along their bottom edge with an inwardly facing groove 10, along their top edge with a flat top surface 12 closely beneath which is a longitudinally extending and outwardly opening groove 14, and along their inner surfaces with inwardly protruding portions 16 and 18 which house longitudinally extending outwardly opening key slots 20 and 22, those key slots having inner wide portions and outer narrow portions.

The walls 2, 4 and 8, in desired numbers, can be shipped unassembled to the location where the conveyor is to be constructed, there to be assembled in the following manner. The side edges of the bottom wall 2 are inserted into the inwardly facing slots 10 along the lower edges of the side walls 8 to produce a seal. The top wall 4 is placed upon the upper surfaces 12 of the side walls 8, there held in place by means of resilient and preferably snap-on clips 24 which engage over the upper surface of the top wall 4 and are received in the outwardly facing side wall grooves 14 just below the surface 12, thereby to sealingly clamp the top wall 4 in place. The side walls 8 are held together, thereby reliably capturing the bottom wall 2, by means of spacers which may take the form of tie rods 26 which extend between the said walls 8 and which have externally threaded portions 28 which extend through appropriately located apertures in the side walls 8 to the exterior thereof, over which portions 28 nuts 30 are received. It is preferred that nuts 32 also be provided on the threaded portions 28 inside the side walls 8, so that those walls are firmly clamped in position. As here illustrated, four tie rods 26, 26' are shown arranged in vertically spaced pairs. The upper tie rods 26', located relatively close to the top wall 4, may be provided with a central area on which is mounted a vertical support plate 34 laterally fixed in position by means of nuts 36 and extending up to and engaging the underside of the top wall 4, thus providing central support for that wall. In the case of particularly wide conveyor sections, a plurality of such support plates 34 may be provided.

Conveying air is supplied to the plenum space defined between the walls 2, 4 and 8 in any appropriate manner, such as by providing an opening in the bottom wall 2 which communicates with the source of conveying air. As here specifically illustrated, blower pods 38 of the type shown in the aforementioned Futer U.S. Pat. No. 4,392,760 may be secured to the underside of a bottom wall 2 where that wall is apertured, that securement being here shown as by means of bolts 40.

Each modular conveyor section is connected to similar sections to produce a conveyor of desired length and configuration by means of splice plates 42 (see FIG. 2) designed to overlap the outer surfaces of side walls 8 of adjacent modular sections A when those sections are abutted. Those splice plates 42 are provided with apertures through which externally threaded shafts 44 of bolts 45 with enlarged heads 46 can pass, the bolt heads 46 being received in the wide portions of the side wall slots 20, 22, the threaded bolt shafts 44 extending out through the narrow slot portions. External nuts 48 are threaded onto the bolt shafts 44, to secure the splice plates 42 to adjacent modular sections A and retain those sections A in closely abutting relationship. If desired, bottom splice plates 43 may be bolted to the bottom walls 2 of adjacent sections.

Figure 4:
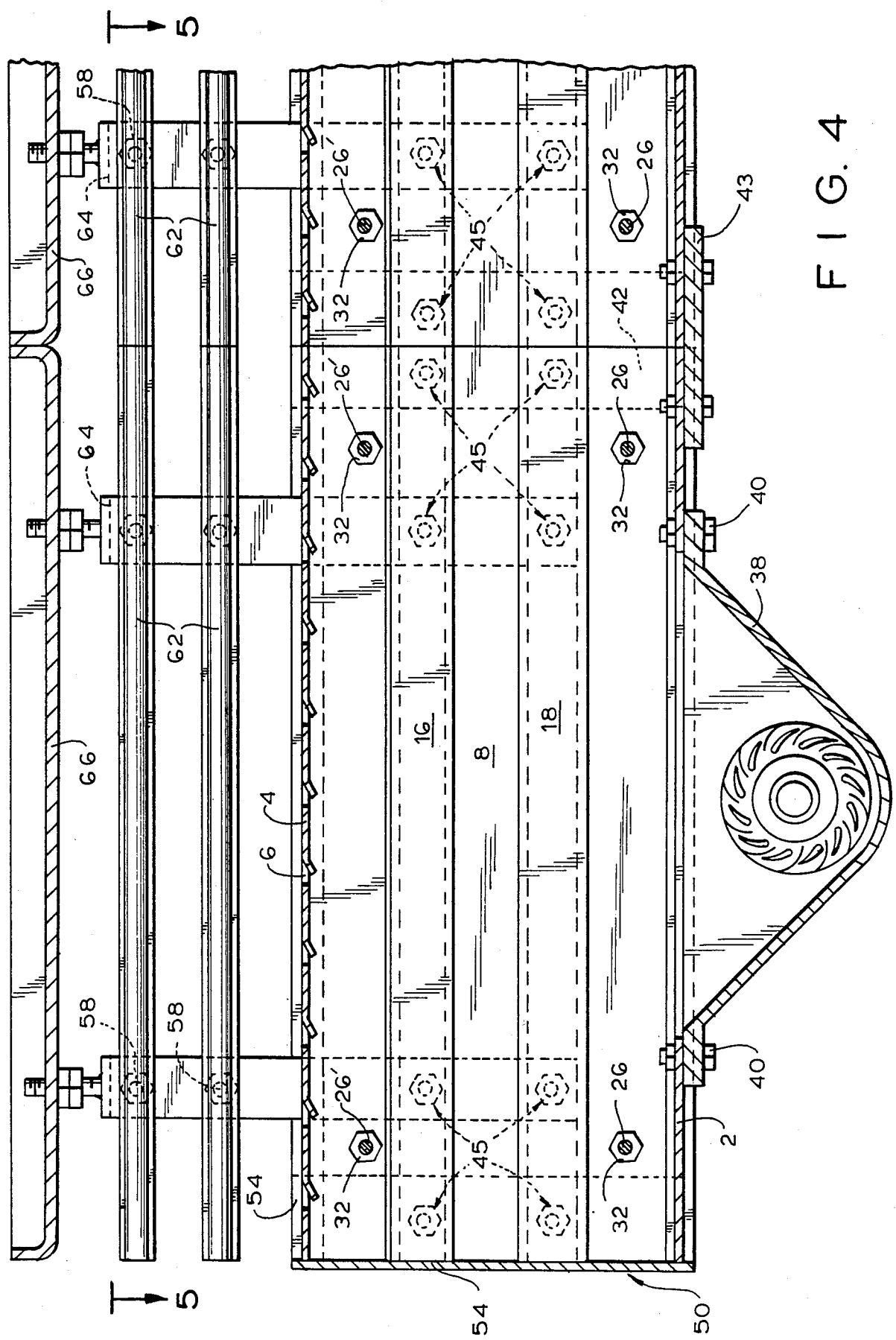
FIG. 4 is a cross-sectional view taken along the line 4—4 of FIG. 3.
Figure 5:
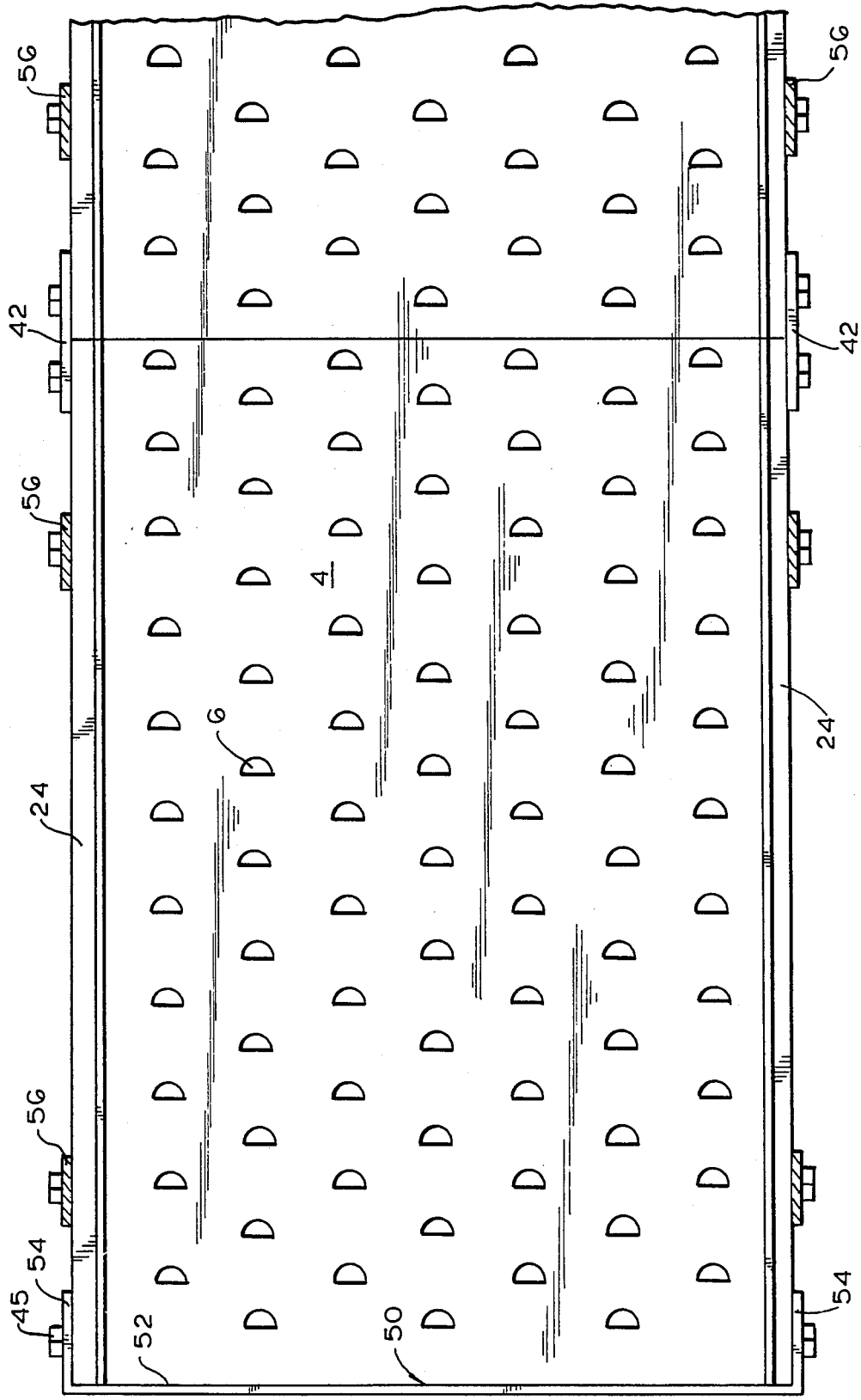
FIG. 5 is a cross-sectional view taken along the line 5—5 of FIG. 4.

To close the ends of a given plenum space, end caps generally designated 50 are provided (see FIG. 4), each comprising an end wall 52 shaped and sized to completely close the space between the walls 2, 4 and 8, with forwardly extending flanges 54 extending from the end wall 52 so as to overlie the outer surfaces of the side walls 8, the flanges 54 being provided with appropriately located apertures to receive the shafts 44 of headed bolts 45 of the type previously described, the heads 46 of those bolts 45 being received in the slots 20, 22 and nuts 48 being employed to secure the end caps 50 in position. The end caps 50 can also be used to separate a given length of conveyor into separate zones, each with its own source of air.

Figure 6:
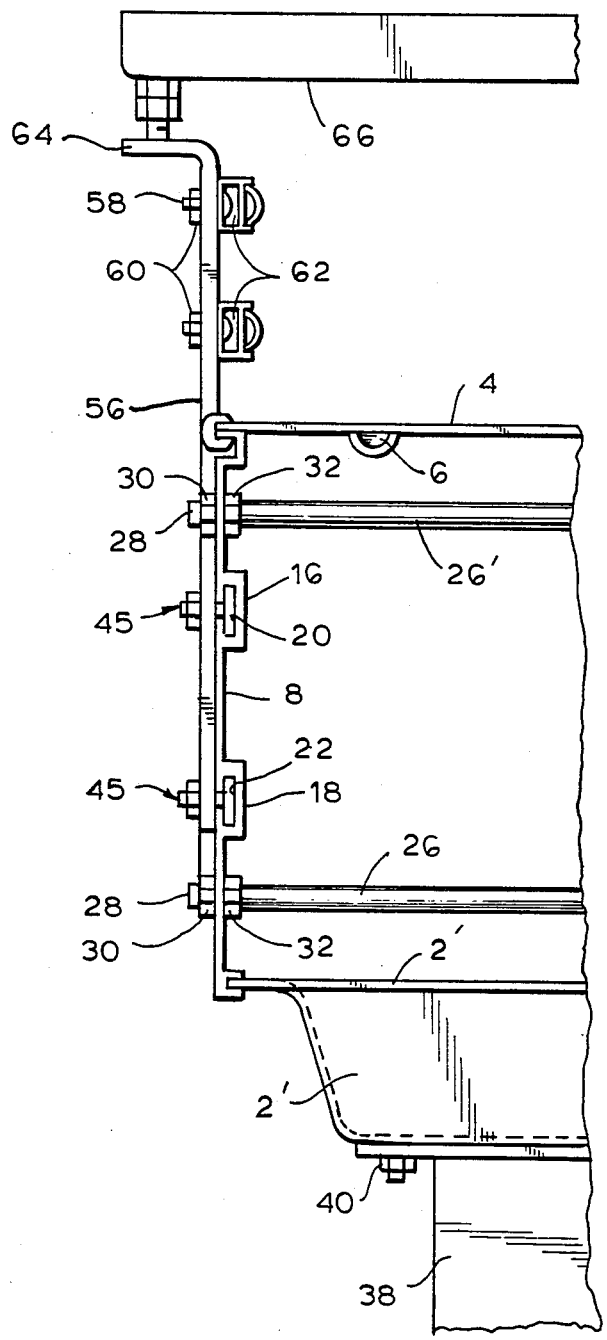
FIG. 6 is a fragmentary cross-sectional view of a second embodiment with a dished bottom wall to produce a plenum space of increased depth.

As thus far described, the modular elements when assembled produce an air conveyor plenum of desired length, width and configuration. If in a particular installation a deeper plenum is desired, that can be accomplished in a simple manner merely by modifying the construction of the bottom wall 2, providing it with a depending dished portion 2' such as is illustrated in FIG. 6. Not only can each modular section be readily assembled and disassembled, but in addition, because of the use of the externally accessible clips 24 to retain the top wall 4 upon the assembly, that top wall can readily be removed when desired, as when access to the interior of the plenum space is desired, as for cleaning purposes, or when a top wall 4 must be replaced either because of wear or because a different conveying air flow is desired.

Conveyors of the type under discussion, depending upon the type of object to be conveyed and the desired speed of conveyance, often require certain auxiliary elements, such as side guides to keep the conveyed objects to their desired path or to reduce the number of lines of objects, or top covers for the conveying space. Such auxiliary elements can readily be added to the basic conveyor structure thus far described through the use of standard brackets 56, which may take the form of structural members having a lower portion overlying the outer surface of the side walls 8 and an upper portion extending above the top wall 4. Those brackets 56 may be mounted in opposed pairs at any desired location along the length of the modular section by means of headed bolts 45 and nuts 48, the heads 46 of the bolts being received in the slots 20, 22 in the same fashion as previously described with respect to the securement of the splice plates 42 and the plenum end caps 50. As here disclosed the upwardly extending portions of the brackets have secured thereto, by means of bolts 58 and nuts 60, longitudinally extending guide bars 62 which serve to close off the sides of the conveying space and thus keep the conveyed objects where they belong. In addition, as here specifically disclosed, the brackets 56 have outwardly bent upper portions 64 on which a top cover 66 may be mounted in any appropriate manner, thereby to define a wall extending over the space through which the conveyed objects pass.

From the above it will be appreciated that the separate structural elements may be kept in inventory, that those standardized elements may be removed from inventory as needed for a particular air conveyor installation, and that those conveyor elements can be shipped unassembled to the factory where the conveyor is to be installed. This gives rise to a very substantial saving. The modular approach also greatly simplifies modification, maintenance and repair of the installed air conveyor, not only by providing ready access to the interior thereof but also by facilitating replacement of parts.

While only a limited number of embodiments of the present invention have been here disclosed, it will be apparent that many variations may be made therein, all within the scope of the invention as defined in the following claims.

We claim:

1. A modular air conveyor assembly section comprising separate wall members comprising bottom wall, top wall apertured to produce a conveying air flow at the upper surface thereof, and a pair of side walls, all of essentially the same length, said side walls having parts for releasably receiving and capturing side portions of said bottom and top walls, and releasable means extending between and engaging said side walls for holding said side walls together and thereby retaining said top and bottom walls in received and captured position relative thereto, the space between said walls defining the plenum of said conveyor and adapted to be placed into communication with a source of conveying air.

2. The modular assembly section of claim 1, in which said side walls are extruded members of complex cross-sectional shape.

3. The modular assembly section of claim 1, in which said side walls are of complex cross-sectional shape and each includes, as one of said parts, an inwardly facing longitudinally extending groove into which said side portions of one of said top and bottom walls are received.

4. The modular assembly section of claim 2, in which each said complex cross-sectional shape includes at least one outwardly facing longitudinally extending key channel adapted to receive the heads of headed elements constituting means for securing auxiliary members to said side walls.

5. The modular assembly section of claim 3, in which each said complex cross-sectional shape includes at least one outwardly facing longitudinally extending key channel adapted to receive the heads of headed elements constituting means for securing auxiliary members to said side walls.

6. In combination with the modular assembly section of claim 4, auxiliary members comprising brackets extending generally vertically outside of and up from said side walls beyond said top wall, and headed elements the heads of which are received in said channels and which are operatively connected to said brackets.

7. In combination with the modular assembly of claim 5, auxiliary members comprising brackets extending generally vertically outside of and up from said side walls beyond said top wall, and headed elements the heads of which are received in said channels and which are operatively connected to said brackets.

8. The modular assembly section of either of claims 6 or 7, in which guides for the conveyed objects are secured to said brackets above said top wall.

9. The modular assembly section of either of claims 6 or 7, in which a cover for the conveying space is mounted on said brackets and extends over and is spaced above said top wall.

10. In combination with the modular assembly section of claim 4, auxiliary members comprising splice plates extending outside said side walls and longitudinally therebeyond to overlie and be secured to the side wall of an adjacent section, thereby to join said sections together in longitudinal communication, and headed elements the heads of which are received in said channels and which are operatively connected to said splice plates.

11. In combination with the modular assembly section of claim 5, auxiliary members comprising splice plates extending outside said side walls and longitudinally therebeyond to overlie and be secured to the side wall of an adjacent section, thereby to join said sections together in longitudinal communication, and headed elements the heads of which are received in said channels and which are operatively connected to said splice plates.

12. In combination with the modular assembly section of claim 4, an auxiliary member comprising a plenum end closure comprising an end wall extending over and closing an end of said section, with side flanges extending from said end wall over said side walls, and headed elements the heads of which are received in said channels and which are operatively connected to said side flanges.

13. In combination with the modular assembly section of claim 5, an auxiliary member comprising a plenum end closure comprising an end wall extending over and closing an end of said section, with side flanges extending from said end wall over said side walls, and headed elements the heads of which are received in said channels and which are operatively connected to said side flanges.

14. The modular assembly section. of any of claims 1, 4, 6 or 10, in which the part for receiving said side side portions of one of said walls other than said side walls comprises an upwardly facing surface of said side walls with a laterally exposed undercut portion and clip means engaging said side portion of said other wall and said undercut portion, thereby to retain said other wall in position on said upwardly facing surface.

15. The modular assembly section of claim 14, in which said undercut portion opens laterally outwardly and said clip means is removably received over said side portion of said other wall, whereby said other wall can readily be removed to expose the interior of said plenum.

16. The modular assembly section of any of claims 1, 4, 6 or 10, in which said means for holding said side walls together comprises tie rods secured to and extending between said side walls.

17. The modular assembly section of claim 16, in which at least one of said tie rods carries an upwardly extending support element engaging the underside of said top wall at a location spaced from said side walls.

* * * * *